United States Patent [19]
Hoenig

[11] 3,730,231
[45] May 1, 1973

[54] WEDGE COUPLING DEVICE BETWEEN A DRIVING SHAFT AND A CONNECTING ROD

[75] Inventor: Ernst Hoenig, Horgen-Zurich, Switzerland

[73] Assignee: Staubli Ltd., Horgen-Zurich, Switzerland

[22] Filed: May 26, 1971

[21] Appl. No.: 146,875

[30] Foreign Application Priority Data

May 29, 1970 Switzerland..........................8034/70

[52] U.S. Cl....................................................139/66
[51] Int. Cl..................................................D03c 1/00
[58] Field of Search......................139/66–73; 74/570

[56] References Cited
UNITED STATES PATENTS 1,256,644  2/1918  Barlow........................................139/66
3,180,366  4/1965  Hoeing........................................139/66
3,468,347  9/1969  Fumat..........................................139/66

*Primary Examiner*—Henry S. Jaudon
*Attorney*—Woodhams, Blanchard and Flynn

[57] ABSTRACT

Dobby, in which the movement of the heald shafts is effected through a connecting rod 18, which connecting rod embraces an eccentric ring 28 on the driving shaft 15. Release of the movement is brought about by a coupling wedge 13, which is supported in the eccentric ring and for control purposes connects with the drive shaft of the connecting ring. The patternlike control of the wedge is effected by an arm 10 which is tiltable in a plane which is radial of the driving shaft. The arm has an opening 14 embracing the shaft, the offset collar 34 of which engages a groove 27 of the wedge.

7 Claims, 5 Drawing Figures

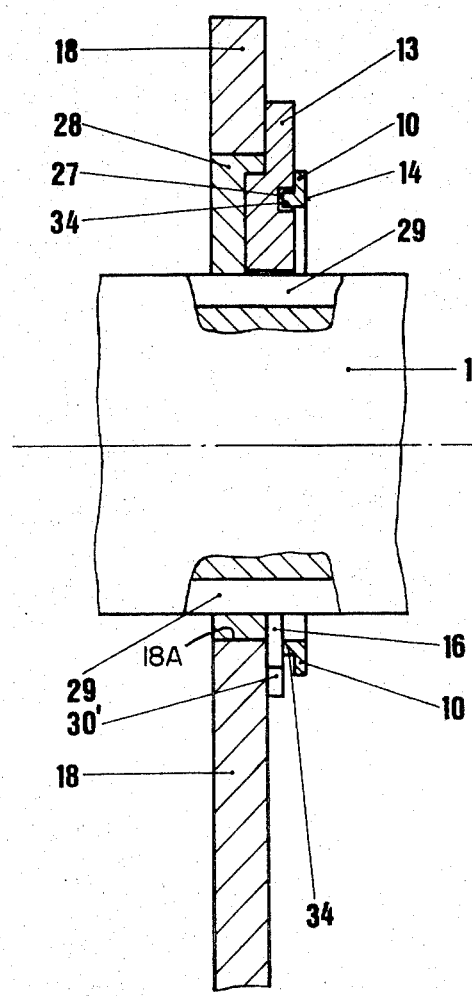
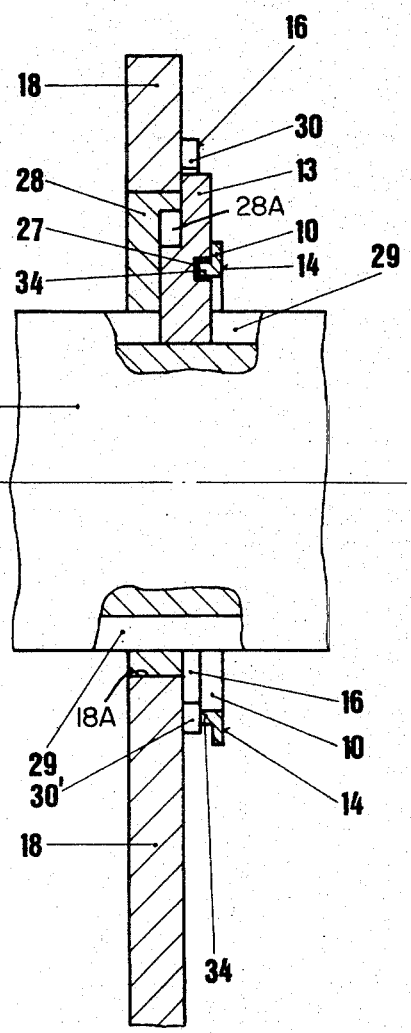

WEDGE COUPLING DEVICE BETWEEN A DRIVING SHAFT AND A CONNECTING ROD

CROSS REFERENCE

This application is related to my copending applications Ser. Nos. 146,867 and 146,878, filed concurrently herewith and reference is to be made thereto.

The invention relates to a wedge coupling controlled according to a preselected pattern and located between a driving shaft and a connecting rod, particularly in dobbies, wherein there is arranged an intermediary eccentric ring with a wedge radially movably supported thereon, which wedge interchangeably engages a groove of the driving shaft or of the connecting rod, whereby the movement of the wedge is externally controlled.

Driving mechanisms for dobbies are known which have wedge couplings in which for each heald shaft an eccentric ring is arranged between the driving shaft and the connecting rod, which latter converts the rotational movement into a translatory movement. A wedge is provided on said ring, which wedge is controlled from a pattern card and, due to its approximately radial movement on the eccentric ring, brings said eccentric ring into engagement either with the driving shaft or with the connecting rod. These two control positions are required in order to move an annexed heald shaft into the upper shed or lower shed position or to hold same in one of these two positions.

In the case of this type of wedge couplings, the problem exists of transferring the position controlled by a pattern card onto the wedge which partly rotates with the driving shaft and is supported on the eccentric ring.

This is accomplished according to the invention in such a manner that the control arm which directly controls the movement of the wedge has a closed, annular ring which has a larger diameter than the driving shaft and encircles same, that the control arm is pivotally supported in the plane of the ring, and that ring and wedge slidingly engage one another. Thus, upon the movement of the control arm, which movement is controlled in a conventional manner by a pattern card, said control arm determines the movement and position of the wedge.

One exemplary embodiment of the subject matter of the invention is illustrated in the drawings, in which:

FIG. 4 is a cross-sectional view along the line X—X of FIG. 1; and

FIG. 5 is a cross-sectional view along the line Y—Y of FIG. 2.

Figure 1:
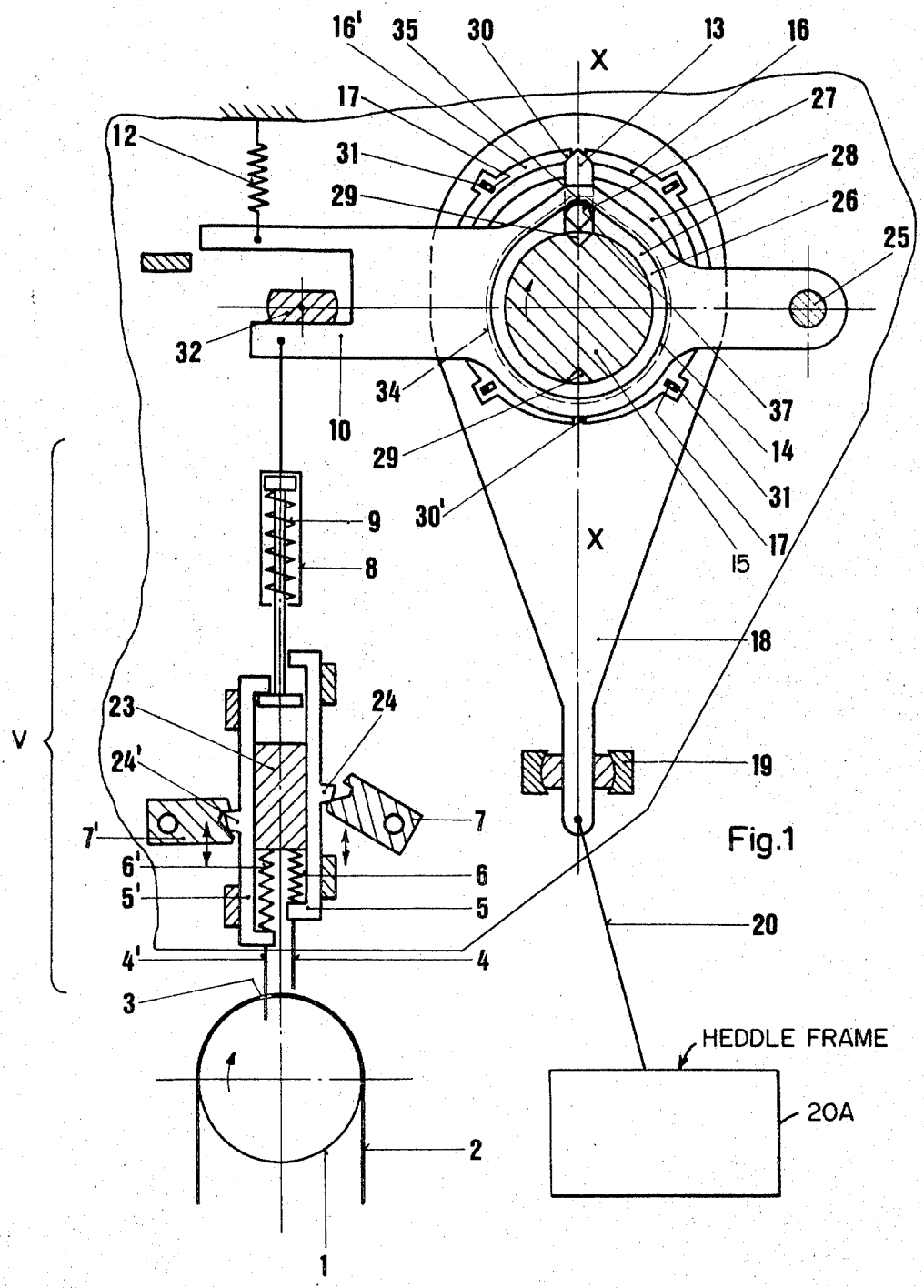
FIG. 1 is a schematic view of the coupling and the control mechanism in upper shed position for the controlled heald shaft and disengaged wedge.

The pattern card 2 which serves to control the heald shafts 20A is moved together with the cylinder 1. The control opening 3 is read by the reading needles 4, 4' by urging the supports 5, 5' of the needles by springs 6, 6' away from the stationary block 23 and toward the pattern card. If no control opening 3 is provided in the pattern card, the needle 4, 4' rides on the card 2 and the rocking lever 7, 7' swings past the nose 24, 24' of the support 5, 5'. However, if an opening 3 appears in the control card 2, the needle moves a small distance into the opening under the pressure of the spring 6, 6', which causes the nose 24, 24' to reach the field of traverse of the lever 7, 7' and the rocking lever 7, 7' takes along the support 5, 5' through the nose 24, 24', which support acts through the tension element 8 and the compensating spring 9 to pull the control arm 10 downwardly against the force of the spring 12. The force of the compensating spring 9 must be greater than the force of the spring 12 holding back the control arm 10.

The control arm 10 is pivotably supported on the axis 25 and has an opening 26 in which a continuously or intermittently driven, as the case may be, driving shaft 15 of the dobby is positioned. The opening 26 has an axially extending rim or edge 14 therearound in the manner of a collar and is received in a groove 27 (FIGS. 4 and 5) in the wedge 13 where it serves as a controlling cam surface. The wedge is supported for movement in a guide 28A (FIG. 5) in the eccentric ring 28 and can engage either one of the recesses 29 of the driving shaft 15 or it may engage one of the zones 30, 30' between the ends of the resilient guide rails 16, 16'.

The resilient, spring steel, guide rails 16 and 16' are semicircular in shape and are arranged to form generally a circle which is radially movable on a connecting rod 18. The guide rails are located approximately concentrically to the outer circumference of the eccentric ring 28. Each ring 16 and 16' abuts against fixed supports 31 under the effect of a resilient, radially inwardly directed spring tension. The guide rings 16 and 16' guide the wedge 13 when same is in engagement with the shaft 15 and moved through a rotational path thereby. The rings 16 and 16' are resiliently retracted when the wedge 13 is improperly engaged with the shaft 15.

Each ring has at least two approximately radially extending slots 17 so that the spring tension of the guide rails brings same into the innermost position with respect to the slots and toward the driving shaft 15. More specifically, the extended axis of each of the slots 17 intersects the theoretical connecting line between the two zones 30 and 30' between the ends of the rings 16 and 16' closer toward its adjacent end than that at which the central point M of the opening 26 in the connecting rod 18 will ever be positioned. The ends of the rings 16 and 16' are tapered and diverge inwardly at the ends to form the open grooves or zones 30 and 30'.

The connection rod 18 has an opening 18A (FIGS. 4 and 5) therethrough which slidingly receives the eccentric ring 28 which is rotatably supported on the driving shaft 15. Said connecting rod converts, during rotation of the coupled eccentric ring with the driving shaft, the rotational movement of the shaft into a vertical translatory movement for the heald shaft. The guide 19 holds the connecting rod 18 against rotation. The tension member or cable 20 is connected to the heald shaft 20A the guided end of the connecting rod 18. Four pins 31 are arranged on the connecting rod 18 which pins are used through the slots 17 as guide and stops for the guide rails 16.

Initially, (and not illustrated), the left needle support 5' is free of engagement with the rocking lever 7' and the needle 4' has penetrated into the opening 3 of the pattern card under the urging of the spring 6'. Through this, the nose 24' reaches the zone of the rocking lever 7' which is engaged by the rocking lever to thrust the needle all of the way in. In response to the tension spring 12, the control arm 10 is initially (FIG. 1) in its highest position. Thus, in one position it abuts the rotatable cam 32 and in the other position it urges the wedge 13 into the zone 30. The heald shaft is in the upper shed position and the driving shaft 15 rotates without influencing the eccentric ring 28. Upon the lowering of the needle support 5' by the rocking lever, the control arm 10 is now also actuated and reaches the position illustrated in FIG. 2 against the bias of the spring 12. At the same time the wedge 13 is disengaged from the zone 30 (position FIGS. 1 and 4) and is moved toward into engagement with the recess 29 of the shaft 15 (position FIGS. 2 and 5) by having the guide edge 14 on the arm 10 move the wedge 13 radially inwardly through the groove 27 (FIGS. 4 and 5) in the wedge 13. The eccentric ring 28 is thereby coupled to the driving shaft 15 and by rotation of the eccentric ring through 180°, the heald shaft connected to the connecting rod 18 is lowered and directed into a lower shed position.

If during the operative cycle of the machine the sequence of operation of the rocking levers permits a needle to be lifted out of the pattern card by the spring 9, the spring 12 which is at this time under tension, will also cause an upward movement to be created on the arm 10 about the axis 25. As a result, when the wedge 13 traverses the periphery of the opening 26 or 360° and returns to an aligned position between the recess 29 and the zone 30, the force of the spring 12 will cause the wedge to move up out of the recess 29 and into the zone 30.

Figure 2:
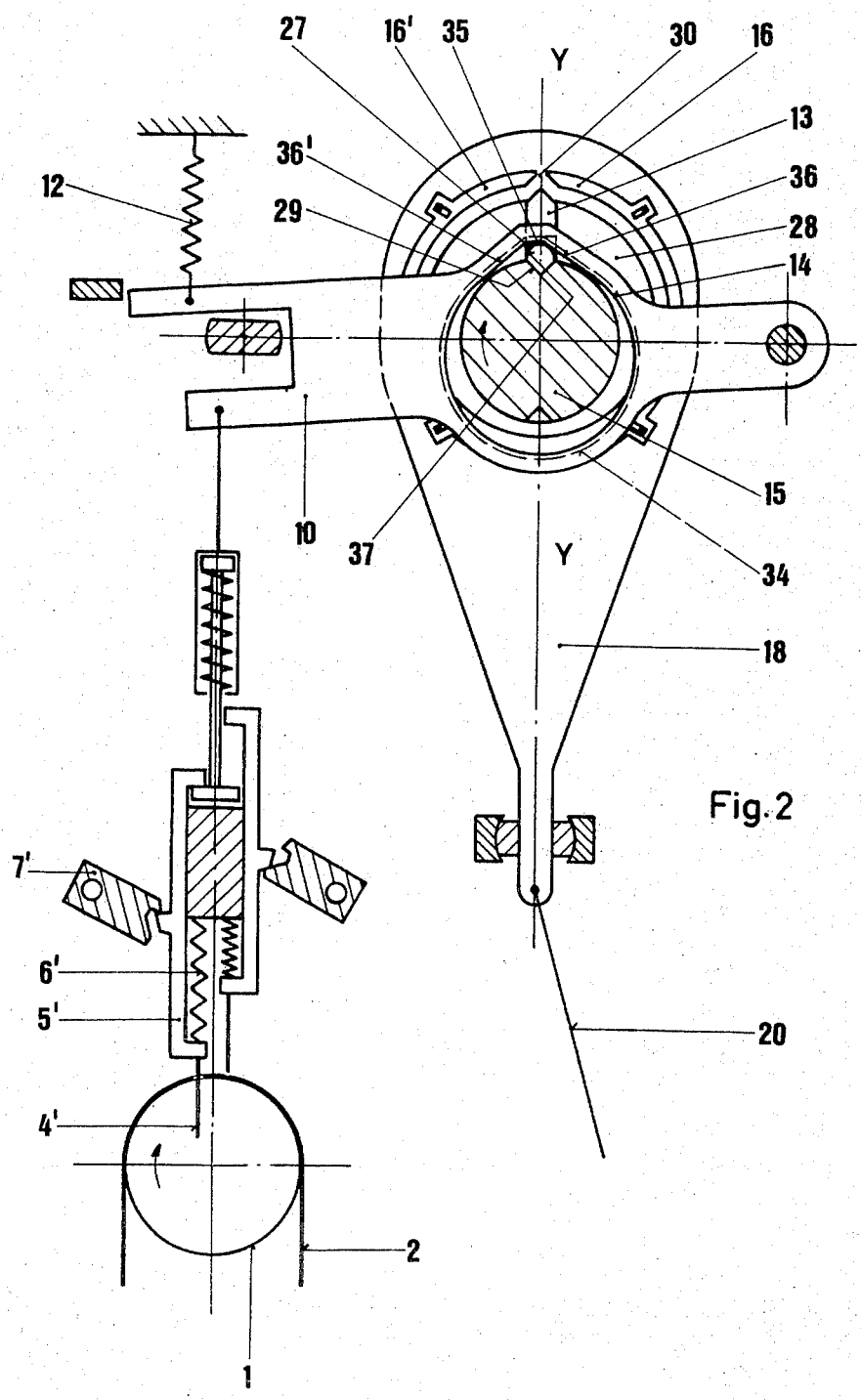
FIG. 2 is the same view with an engaged wedge.
Figure 3:
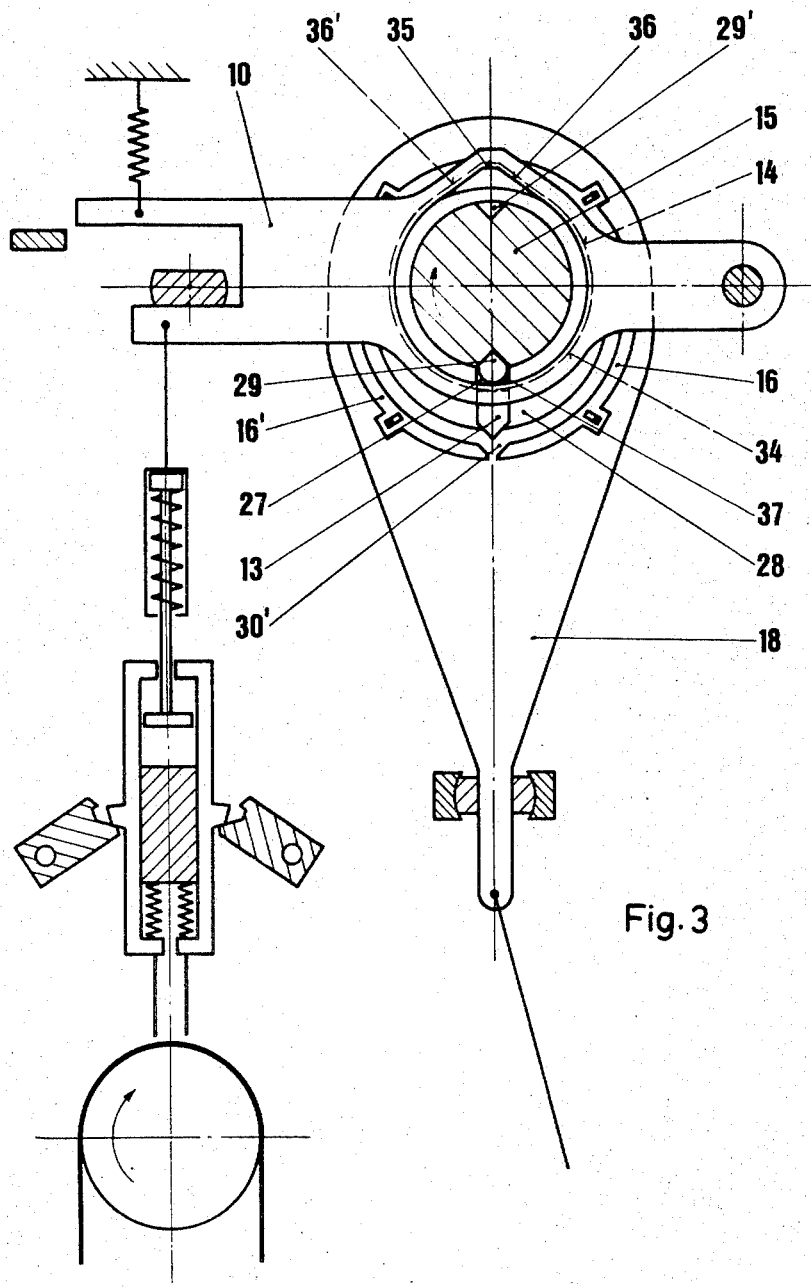
FIG. 3 is the same view with an engaged wedge and a driving shaft rotated for 180°.

The annular ring 14 which causes a transfer of the movement of the control arm 10 onto the wedge 13 has an L-shaped cross section. An annular flange 34 of the ring 14 projects from the ring plane and slidingly engages and is received in a groove 27 of the wedge 13. Since the control arm 10 as a practical matter, does not move during the rotation of the wedge 13 when engaged with the shaft 15 and in any case does not pivot appreciably, it is important that the sliding connection between ring 14 and wedge 13 be well constructed. As illustrated by FIG. 3, the driving shaft 15 and the ring 14 are in this position practically concentric to one another for which reason the lower part of the ring is constructed as a circular arc. Since during the control for the upper shed position of a heald shaft as is illustrated in FIG. 2, a substantial eccentricity exists between the driving shaft 15 and the ring 14, the annular ring 14 has at least one place 35 where it extends rectilinearly over a short distance. The adjacent distances 36, 36' extend also rectilinearly and are positioned tangentially to the remaining circular ring. In place of three straight distances, the ring can at this point also have a somewhat elliptically arcuate shape.

The groove 27 in the wedge 13 is limited by two sidewalls of which the radially inner groove wall 37 (FIG. 1) is chamfered so that the circular ring can more easily slide off.

The force transfer means between the ring 14 and wedge 13, can, however, also be of different construction provided a good sliding relationship is maintained between the ring and the wedge.

The groove 27 of the wedge 13 can be formed of two annular ridges which are positioned approximately concentric to one another and which project beyond the plane of the eccentric ring.

Instead of the groove being arranged on the wedge and the projecting collar on the ring of the control arm, the groove can also be placed in the ring of the control arm. In such case, the wedge is provided with projecting parts, for example pins, which engage the groove.

The wedge 13 can also consist of two partial wedges positioned side-by-side, in which each partial wedge is controlled by the ring. Since these partial wedges are supported independently of one another and radially movably in the eccentric ring, they can one after the other engage the recesses 29 of the driving shaft or recesses 30, 30'.

The embodiments of the invention in which an exclusive property or privilege is claimed are defined as follows:

1. A coupling device, comprising:
   a rotatable drive shaft;
   an eccentric ring mounted on said drive shaft and being rotatable with respect thereto;
   a connecting rod having means defining a first opening therein and adapted to rotatably receive said eccentric ring therein;
   wedge means radially movable toward and away from said drive shaft under control of a pattern card reading mechanism for selectively connecting said eccentric ring to said drive shaft, said wedge means including a wedge radially slideably mounted on said eccentric ring and a movably supported control arm having means defining a second opening therethrough larger in diameter than said drive shaft and receiving said drive shaft, the axis of said second opening being perpendicular to the direction of movement of said control arm; and
   connecting means for connecting said control arm to said wedge whereby a movement of said control arm effects a radially slideable movement of said wedge.

2. A coupling device according to claim 1, wherein said connecting means comprises a groove on said wedge and an axially extending flange on said control arm encircling said second opening, said flange being slideably received in said groove so that a movement of said control arm will effect a movement of said wedge.

3. A coupling device according to claim 2, wherein said control arm is pivotally supported for movement about a pivot axis.

4. A coupling device according to claim 2, wherein at least the radially inner side of said groove is chambered adjacent the ends thereof.

5. A coupling device according to claim 2, wherein said drive shaft has means defining at least one recess therein; and
   wherein said wedge is slideably mounted for movement into and out of said recess to couple and uncouple, respectively, said eccentric ring with said drive shaft.

6. A coupling device according to claim 2, wherein the peripheral edge of said second opening and said axially extending flange are parallel.

7. A coupling device according to claim 6, wherein said peripheral edge of said second opening extends at least at one location rectilinearly over a short zone and circularly over a portion diametrically opposite thereof and the remaining zones adjacent said short zone extend rectilinearly and tangentially to the said circular portion.

* * * * *